United States Patent
Burns et al.

(10) Patent No.: US 11,792,868 B2
(45) Date of Patent: Oct. 17, 2023

(54) PROXIMITY-BASED CONNECTION FOR BLUETOOTH DEVICES

(71) Applicant: Bose Corporation, Framingham, MA (US)

(72) Inventors: Benjamin Colin Burns, Somerville, MA (US); Naganagouda Patil, Westborough, MA (US); Pramodh Guruswamy Alathur, Shrewsbury, MA (US); Santiago Carvajal, Sagamore Beach, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 18/106,662

(22) Filed: Feb. 7, 2023

(65) Prior Publication Data

US 2023/0180316 A1 Jun. 8, 2023

Related U.S. Application Data

(63) Continuation of application No. 17/314,270, filed on May 7, 2021, now Pat. No. 11,601,996.

(51) Int. Cl.
*H04W 76/14* (2018.01)
*H04B 17/318* (2015.01)

(52) U.S. Cl.
CPC .......... *H04W 76/14* (2018.02); *H04B 17/318* (2015.01)

(58) Field of Classification Search
CPC ............................ H04W 76/14; H04B 17/318
See application file for complete search history.

(56) References Cited

U.S. PATENT DOCUMENTS

| | | | |
|---|---|---|---|
| 9,066,327 B2 | 6/2015 | Liu | |
| 10,491,734 B1 | 11/2019 | Annasagaram Krishnamurthy .... | H04W 12/50 |
| 10,705,793 B1 * | 7/2020 | Young ..................... | G10L 15/22 |
| 10,743,165 B1 | 8/2020 | Patel et al. | |
| 2012/0003932 A1 | 1/2012 | Zhodzishsky ..... | H04W 52/0229 455/41.2 |
| 2012/0115464 A1 | 5/2012 | Jang ...................... | H04W 8/005 455/426.1 |
| 2012/0225634 A1 * | 9/2012 | Gee .......................... | H04L 67/12 455/404.1 |
| 2014/0256260 A1 | 9/2014 | Ueda et al. | |
| 2016/0232515 A1 * | 8/2016 | Jhas ................... | G06Q 20/3278 |
| 2018/0370758 A1 | 12/2018 | Huang .................. | B66B 1/3461 |

(Continued)

*Primary Examiner* — Duc C Ho
(74) *Attorney, Agent, or Firm* — Hoffman Warnick LLC (57) ABSTRACT

Various implementations include approaches for establishing a Bluetooth (BT) connection between devices. One example approach includes: in response to a trigger at a first Bluetooth (BT) device, attempting to determine a received signal strength indicator (RSSI) from each of a set of additional Bluetooth (BT) devices paired to the first BT device, in response to determining the RSSI for a first additional BT device and a second additional BT device in the set of additional BT devices, determining if the RSSI of each of the first additional BT device and the second additional BT device satisfies a threshold, and in response to determining that the RSSI of both the first additional BT device and the second additional BT device satisfy the threshold, selecting either the first additional BT device or the second additional BT device for connection with the first BT device.

20 Claims, 4 Drawing Sheets

(56) References Cited

U.S. PATENT DOCUMENTS

| 2020/0053611 A1 | 2/2020 | Jorgovanovic | H04W 36/03 |
| 2020/0128394 A1 | 4/2020 | Han | H04W 8/005 |

* cited by examiner

PROXIMITY-BASED CONNECTION FOR BLUETOOTH DEVICES

PRIORITY CLAIM

This application is a continuation application of, and claims priority to, U.S. Pat. No. 11,601,996 (U.S. patent application Ser. No. 17/314,270, filed May 7, 2021) the entire contents of which are incorporated by reference herein.

TECHNICAL FIELD

This disclosure generally relates to device connection. More particularly, the disclosure relates to establishing a Bluetooth connection between previously paired devices.

BACKGROUND

While Bluetooth pairing and connection has significant benefits, one shortcoming of traditional Bluetooth connection occurs during the attempted connection phase between already paired devices (e.g., a source device and a sink device). Conventional approaches for connecting two devices over Bluetooth include attempting to connect a sink (also referred to as an "output", "destination", or "peripheral") device with a most recently connected source (also referred to as an "input" or "host") device in a list of already paired devices. However, these approaches often fail to connect the desired devices.

SUMMARY

All examples and features mentioned below can be combined in any technically possible way.

Various implementations include approaches for establishing a Bluetooth (BT) connection between devices. Additional implementations include BT devices configured to establish a BT connection with another device.

In some particular aspects, a method includes: in response to a trigger at a first BT device, attempting to determine a received signal strength indicator (RSSI) of an additional (e.g., second) BT device paired to the first BT device, the additional BT device having a highest priority on a list of one or more BT devices paired to the first BT device; in response to determining the RSSI for the additional BT device, determining if the RSSI of the additional BT device satisfies a threshold; and in response to determining that the RSSI of the additional BT device satisfies the threshold, attempting to establish a BT connection between the first BT device and the additional BT device.

In some particular aspects, a first BT device includes: a BT radio; and a controller coupled with the BT radio and configured to control a BT connection by: in response to a trigger at the first BT device, attempting to determine a received signal strength indicator (RSSI) of an additional (e.g., second) Bluetooth (BT) device paired to the BT device, the additional BT device having a highest priority on a list of one or more BT devices paired to the first BT device; in response to determining the RSSI for the additional BT device, determining if the RSSI of the additional BT device satisfies a threshold; and in response to determining that the RSSI of the additional BT device satisfies the threshold, attempting to establish a BT connection between the first BT device and the additional BT device.

In further particular aspects, a method includes: in response to a trigger at a first Bluetooth (BT) device, attempting to determine a received signal strength indicator (RSSI) from each of a set of additional Bluetooth (BT) devices paired to the first BT device, in response to determining the RSSI for a first additional BT device and a second additional BT device in the set of additional BT devices, determining if the RSSI of each of the first additional BT device and the second additional BT device satisfy a threshold, and in response to determining that the RSSI of both the first additional BT device and the second additional BT device satisfies the threshold, selecting either the first additional BT device or the second additional BT device for connection with the first BT device.

In other particular aspects, a first Bluetooth (BT) device includes: a BT radio, and a controller coupled with the BT radio and configured to control a BT connection by, in response to a trigger at the first BT device, attempting to determine a received signal strength indicator (RSSI) from each of a set of additional Bluetooth (BT) devices paired to the first BT device, in response to determining the RSSI for a first additional BT device and a second additional BT device in the set of additional BT devices, determining if the RSSI of each of the first additional BT device and the second additional BT device satisfies a threshold, and in response to determining that the RSSI of both the first additional BT device and the second additional BT device satisfy the threshold, selecting either the first additional BT device or the second additional BT device for connection with the first BT device.

Implementations may include one of the following features, or any combination thereof.

In certain implementations, the method further includes: in response to: a) not receiving the RSSI of the additional BT device, or b) the RSSI of the additional BT device not satisfying the threshold: attempting to determine an RSSI of a further additional (e.g., a third) BT device paired to the first BT device.

In particular cases, the method further includes: in response to determining that the RSSI of the further additional (e.g., third) BT device satisfies the threshold, attempting to establish a BT connection between the further additional BT device and the first BT device, wherein the further additional BT device has a second-highest priority on the list of one or more BT devices.

In some aspects, the further additional BT device is selected from a remainder of the list of one or more BT devices based on at least one of: a determined RSSI of the additional paired BT devices, or a known RSSI characteristic of the additional paired BT devices.

In certain implementations, the method further includes, in response to the not receiving an RSSI of the additional BT device: repeating the attempt to determine an RSSI of the additional Bluetooth (BT) device prior to attempting to determine an RSSI of the further additional BT device.

In particular aspects, repeating the attempt to determine an RSSI of the additional BT device paired to the first BT device is performed at least one time prior to attempting to determine an RSSI of the further additional BT device. In certain implementations, repeating the attempt to determine an RSSI of the additional BT device is performed approximately 1-10 times prior to attempting to determine an RSSI of the further additional BT device. In particular cases, repeating the attempt to determine an RSSI of the additional BT device is performed approximately 1-3 times prior to attempting to determine an RSSI of the further additional BT device.

In some cases, in a paired configuration, the first BT device is a sink BT device and the additional paired BT devices are source BT devices.

In certain implementations, the list of one or more BT devices paired to the first BT device have each previously connected with the first BT device with a BT connection and are not currently connected with the first BT device.

In particular aspects, the list of one or more BT devices paired to the first BT device is prioritized based on at least one of: a recentness of connection with the first BT device, a frequency of connection with the BT device, a user-defined priority, a BT profile of a last connection with the first BT device, or a recent sweep of proximity to the first BT device.

In some implementations, the trigger includes at least one of: detecting BT range between the first BT device and the additional BT device, providing an input at the first BT device, initiating charging of another device, mechanically actuating the first BT device, receiving an input from the additional BT device, detecting a change in BT state of the first BT device, or detecting a change in power state of the first BT device.

In particular cases, the method further includes, prior to attempting to determine the RSSI of the additional BT device paired to the first BT device, re-prioritizing the list of one or more BT devices in response to determining that the additional BT device is currently powered on and connected to the first BT device.

In some implementations, re-prioritizing the list of one or more BT devices paired to the first BT device comprises deprioritizing the additional BT device on the list of one or more BT devices.

In certain cases, the method further includes, in response to a user command, attempting to establish a BT connection between the first BT device and the additional device without determining an RSSI of the additional BT device.

In particular aspects, the method further includes filtering the list of one or more BT devices to remove or deprioritize at least one of: a duplicate BT device, a BT device incapable of outputting audio, a device currently connected to the first BT device, a device most recently connected to the first BT device, a device that is unresponsive to connection attempts, or secondary devices in a paired device system.

In some implementations, the BT device further includes an electro-acoustic transducer coupled with the controller for providing an audio output.

In certain implementations, the method further includes, attempting to establish a BT connection between the selected one of the first additional BT device or the second additional BT device and the first BT device.

In certain aspects, the set of additional BT devices includes at least three BT devices.

In some cases, each of the set of additional BT devices is included in a list of BT devices paired to the first BT device.

In certain implementations, selecting the first additional BT device or the second additional BT device is based on a priority on the list of BT devices.

In particular cases, selecting the first additional BT device or the second additional BT device is further based on comparing the determined RSSI of each of the first additional BT device and the second additional BT device with the threshold.

In some aspects, selecting the first additional BT device or the second additional BT device is based on a highest determined RSSI.

In particular implementations, a method further includes, in response to not receiving the RSSI from the first additional BT device and the RSSI from the second additional BT device, checking a first device connection counter.

In some cases, a method further includes, in response to the first device connection counter being exceeded, attempting to determine an RSSI of a third additional BT device in the set of additional BT devices.

In certain aspects, the method further includes, in response to the first device connection counter not being exceeded, again attempting to determine the RSSI of the first additional BT device and the second additional BT device.

In particular cases, the method further includes, in response to the received RSSI from the first additional BT device and the received RSSI from the second additional BT device each not satisfying a threshold, checking a second device connection counter.

In some cases, the method further includes, in response to the second device connection counter being exceeded, attempting to determine an RSSI of a third additional BT device in the set of additional BT devices.

In particular cases, the method further includes, in response to the second device connection counter not being exceeded, again attempting to determine the RSSI of the first additional BT device and the RSSI of the second additional BT device.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that selecting a Bluetooth (BT) device for connection can be enhanced by determining a received signal strength indicator (RSSI) from one or more devices in a paired device list. For example, a connection approach relying on RSSI can improve the likelihood of connecting the desired BT devices as compared with conventional recency-focused (or priority-focused) approaches, thereby saving time and enhancing the user experience.

In particular cases, in response to a trigger at a first BT device, an approach includes attempting to determine an RSSI of an additional paired BT device that has a highest priority on a list of BT devices paired to the first BT device. If the RSSI of the additional (paired) BT device satisfies a threshold, an approach further includes attempting to establish a BT connection between the devices. If the RSSI of the additional paired BT device is either not received or does not satisfy the threshold, an approach can include attempting to determine an RSSI of a further additional (paired) BT device, e.g., a next-highest priority BT device on the list. Because RSSI is a strong indicator of physical proximity and provides a reliable signal, the RSSI-based approaches described herein enhance the likelihood of connecting a desired set of (previously) paired BT devices. That is, these approaches rely at least in part on the assumption that users wish to connect BT devices within a proximity range, and not necessarily based on a most recent connection or frequency of connections between devices.

Commonly labeled components in the FIGURES are considered to be substantially equivalent components for the purposes of illustration, and redundant discussion of those components is omitted for clarity.

Figure 1:
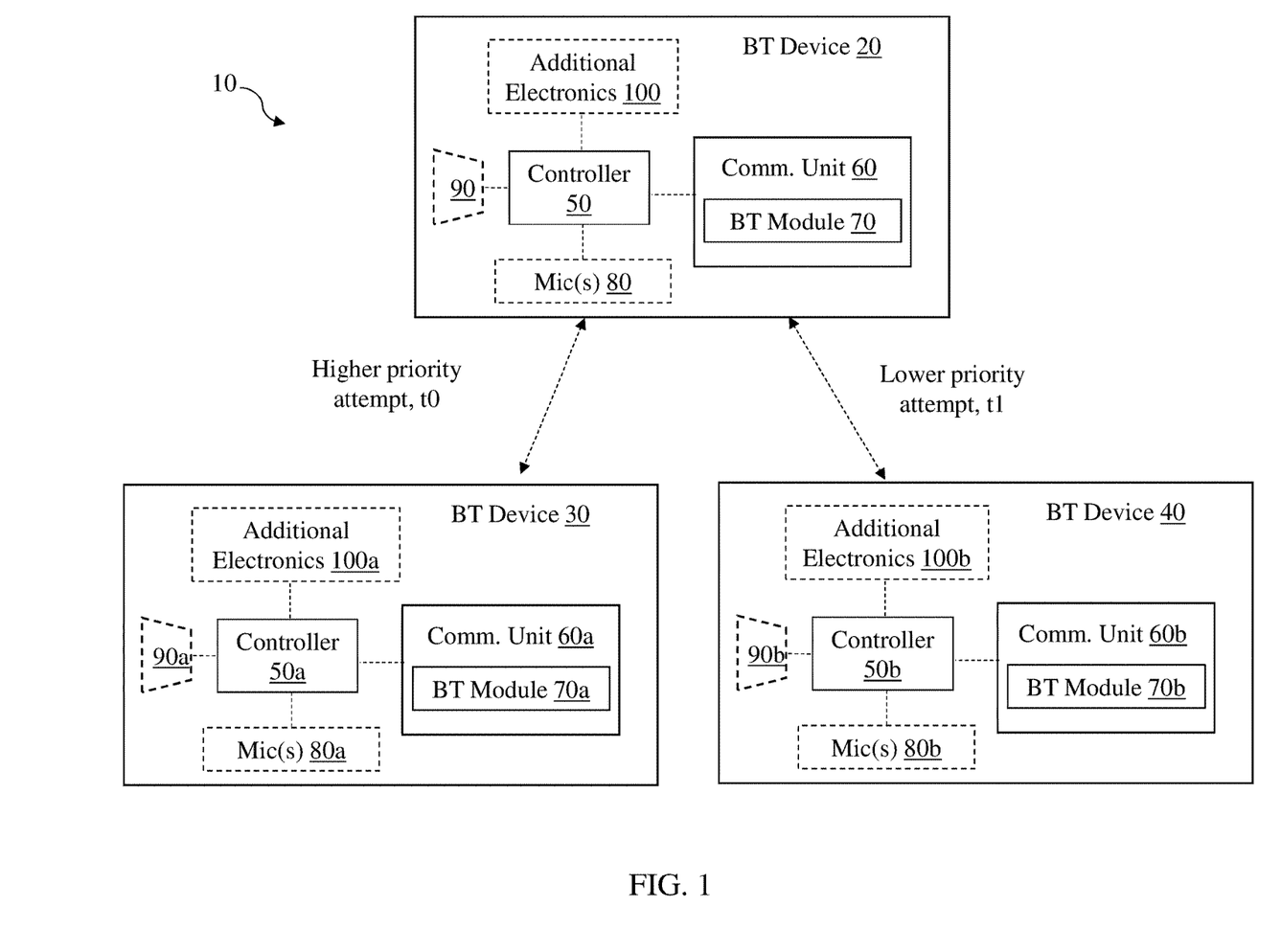
FIG. 1 is a block diagram of a system including Bluetooth enabled audio devices according to various disclosed implementations.

FIG. 1 shows an example of a system 10 including a set of Bluetooth-enabled devices (or simply, Bluetooth devices, or BT devices) according to various implementations. As noted herein, Bluetooth-enabled devices include a Bluetooth radio or other Bluetooth-specific communication system enabling connection over Bluetooth protocol. System 10 includes a first BT device 20, and an additional (or, second) BT device 30. In this example, system 10 also includes a further additional (or, third) BT device 40. In the example illustrated in FIG. 1, first BT device 20 is a BT sink device (otherwise referred to as an "output device", "destination device", or "peripheral device"), and additional BT devices 30, 40 are BT source devices (otherwise referred to as "input device", or "host device"). Example Bluetooth-enabled source devices (e.g., additional devices 30, 40), include, but are not limited to, a smartphone, a tablet computer, a personal computer, a laptop computer, a notebook computer, a netbook computer, a radio, an audio system (e.g., portable and/or fixed), an Internet Protocol (IP) phone, a communication system, an entertainment system, a headset, a smart speaker, a piece of exercise and/or fitness equipment, a portable media player, an audio storage and/or playback system, and so forth. Example Bluetooth-enabled sink devices (e.g., first BT device 20) include, but are not limited to, a headphone, a headset, an audio speaker (e.g., portable and/or fixed, with or without "smart" device capabilities), an entertainment system, a communication system, a smartphone, a vehicle audio system, a piece of exercise and/or fitness equipment, an out-loud (or, open-air) audio device, a wearable private audio device, and so forth. Additional BT devices can include a portable game player, a portable media player, an audio gateway, a BT gateway device (for bridging BT connection between other BT-enabled devices), an audio/video (A/V) receiver as part of a home entertainment or home theater system, etc. A Bluetooth-enabled device as described herein may change its role from source to sink or sink to source depending on a specific application.

The Bluetooth-enabled first device 20 can include a controller 50 and a communication (comm.) unit 60 coupled with the controller 50. The communication unit 60 includes a Bluetooth module 70 (e.g., including a Bluetooth radio), enabling communication with other devices over Bluetooth protocol. In certain example implementations, BT device 20 can also include one or more microphones (mic(s)) 80 (e.g., a single microphone or a microphone array), and an electro-acoustic transducer 90 for providing an audio output. The BT device 20 can also include additional electronics 100, such as a power manager and/or power source (e.g., battery or power connector), memory, sensors (e.g., IMUs, accelerometers/gyroscope/magnetometers, optical sensors, voice activity detection systems), etc. In some cases, the memory may include a flash memory and/or non-volatile random access memory (NVRAM). In particular cases, memory stores: a microcode of a program for processing and controlling the controller 50 and a variety of reference data; data generated during execution of any of the variety of programs performed by the controller 50; a Bluetooth connection process; and/or various updateable data for safekeeping such as paired device data, connection data, device contact information, etc. Certain of the above-noted components depicted in FIG. 1 are optional, and are displayed in phantom.

In certain cases, the controller 50 can include one or more microcontrollers or processors having a digital signal processor (DSP). In some cases, the controller 50 is referred to as control circuit(s). The controller(s) 50 may be implemented as a chipset of chips that include separate and multiple analog and digital processors. The controller 50 may provide, for example, for coordination of other components of the BT device 20, such as control of user interfaces (not shown) and applications run by the BT device 20. In various implementations, controller 50 includes a BT connection control module (or modules), which can include software and/or hardware for performing BT connection control processes described herein. For example, controller 50 can include a BT connection control module in the form of a software stack having instructions for controlling functions in BT device connection (e.g., between BT device 20 and additional BT devices 30, 40, etc.) according to any implementation described herein. As described herein, the controller 50 is configured to control functions in an RSSI-based connection approach according to various implementations.

The communication unit 60 can include the BT module 70 configured to employ a wireless communication protocol such as Bluetooth, along with additional network interface(s) such as those employing one or more additional wireless communication protocols such as IEEE 802.11, Bluetooth Low Energy, or other local area network (LAN) or personal area network (PAN) protocols such as WiFi. In particular implementations, communication unit 60 is particularly suited to communicate with other communication units 60 in BT devices 30, 40 via Bluetooth.

As noted herein, controller 50 controls the general operation of the Bluetooth-enabled device 20. For example, the controller 50 performs a process and control for audio and data communication. In addition to the general operation, the controller 50 initiates a Bluetooth function implemented in the Bluetooth module 70 upon detecting certain triggers (or, events), described herein. The controller 50 initiates an operation (e.g., connection) between BT device 20 and additional BT devices 30, 40, if specific conditions are satisfied.

The Bluetooth module 70 enables a wireless connection using Radio Frequency (RF) communication between the BT device 20 and additional BT devices 30, 40, etc. The Bluetooth module 70 exchanges a radio signal including data input/output through an antenna (not shown). For example, in a transmission mode, the Bluetooth module 70 processes data by channel coding and spreading, converts the processed data into a Radio Frequency (RF) signal and transmits the RF signal. In a reception mode, the Bluetooth module 70 converts a received RF signal into a baseband signal, processes the baseband signal by de-spreading and channel decoding and restores the processed signal to data.

Additionally, the Bluetooth module 70 can ensure secured communication between devices, and protect data using encryption.

The additional BT devices 30, 40, etc. can include a controller 50a, 60b and communication unit 60a, 60b having a BT module 70a, 70b, enabling BT communication between BT device 20 and additional BT devices 30, 40. Additional BT devices 30, 40 can include one or more components described with reference to BT device 20, each of which is illustrated in phantom as optional in certain implementations. Notations "a" and "b" indicate that components in BT devices 30, 40 are physically separate from similarly labeled components in BT device 20, but can take a similar form and/or function as their labeled counterparts in BT device 20. Additional description of these similarly labeled components is omitted for brevity. Further, as noted herein, additional BT devices 30, 40 can differ from BT device 20 in terms of form factor, intended usage, and/or capability, but in any case, are configured to communicate with BT device 20 over Bluetooth.

In general, the Bluetooth module(s) 70, 70a, 70b include Bluetooth radios and additional circuitry. More specifically, the Bluetooth module 70 of the BT device 20 and the Bluetooth modules 70a,b of the BT devices 30, 40, etc. include both a Bluetooth radio and a Bluetooth LE (BLE) radio. In various implementations, presence of a BLE radio in the Bluetooth module 70 is optional. That is, as noted herein, various implementations utilize only a (classic) Bluetooth radio for connection functions. In implementations including a BLE radio, the Bluetooth radio and the BLE radio are typically on the same integrated circuit (IC) and share a single antenna, while in other implementations the Bluetooth radio and BLE radio are implemented as two separate ICs sharing a single antenna or as two separate ICs with two separate antennae. The Bluetooth specification, i.e., Bluetooth 5.2: Low Energy, provides the BT device 20 with forty channels on 2 MHz spacing. The forty channels are labeled 0 through 39, which include 3 advertising channels and 37 data channels. The channels labeled as 37, 38 and 39 are designated as advertising channels in the Bluetooth specification while the remaining channels 0-36 are designated as data channels in the Bluetooth specification.

Figure 2:
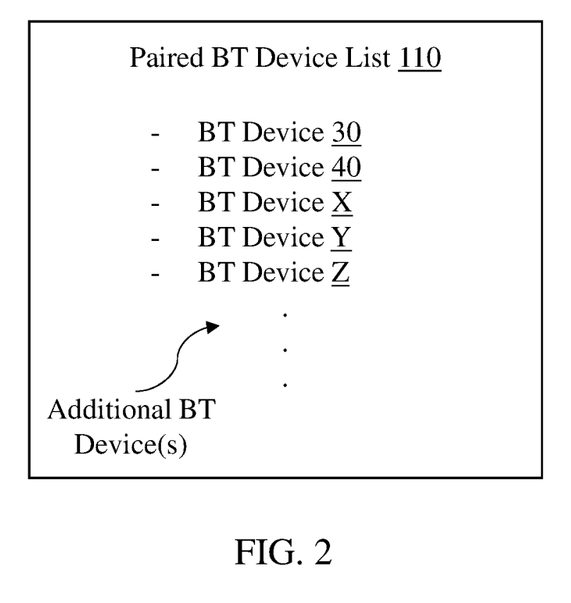
FIG. 2 is a schematic depiction of a paired BT device list according to various implementations.

As noted herein, various implementations are particularly suited for making device connection decisions among previously paired BT devices. As such, approaches described according to these implementations relate to connecting additional BT devices 30, 40, etc. with first BT device 20 where those additional BT devices have a pairing with BT device 20. FIG. 2 shows a paired BT device list (paired device list) 110 associated with BT device 20. In some cases, the paired device list 110 is stored in one or more portions of the memory at BT device 20, or is otherwise accessible to controller 50 in maintaining, updating or otherwise accessing the paired device list 110. In some cases, the paired device list 100 is arranged in terms of top-down priority, but in other cases, the priority of devices on the list 100 is arranged in any other priority scheme. As shown in this example, the paired device list 100 includes BT device 30 and BT device 40, along with further additional BT devices X, Y, Z, and spaces for still further additional BT devices. In certain examples, the BT device 20 is configured to maintain a paired device list 100 of several or more paired devices, which can include four, five, six, seven, eight or more paired devices. In particular cases, the paired device list 110 is made available to the user via an interface (e.g., audio interface, visual interface such as a display, etc.), e.g., for pairing additional devices with BT device 20. Pairing of devices on paired device list 100 with the BT device 20 can be performed according to any conventional approach, e.g., any conventional Bluetooth, BLE or other Bluetooth-related pairing approach. Certain example approaches of Bluetooth-related pairing are described in U.S. Pat. No. 9,066,327 (issued on Jun. 23, 2015), which is incorporated by reference in its entirety.

In certain examples, the paired device list 110 is prioritized in order to control connection between the BT device 20 and paired, additional BT devices, e.g., BT device 30, BT device 40, etc. In a particular example, the paired device list 110 is arranged in terms of top-down priority, such that in the example in FIG. 2, BT device 30 is given priority over BT device 40, which in turn has priority over BT device X, which in turn has priority over BT device Y, etc. In some examples, the paired device list 110 is prioritized based on at least one of: a recentness of connection with the first BT device, a frequency of connection with the BT device, a user-defined priority, a BT profile of a last connection with the first BT device (e.g., audio connection profile having higher priority than other connection profiles), or a recent sweep of proximity to the first BT device 20 (e.g., using RSSI or any other proximity-based indicator such as an optical and/or acoustic sensor).

Figure 3:
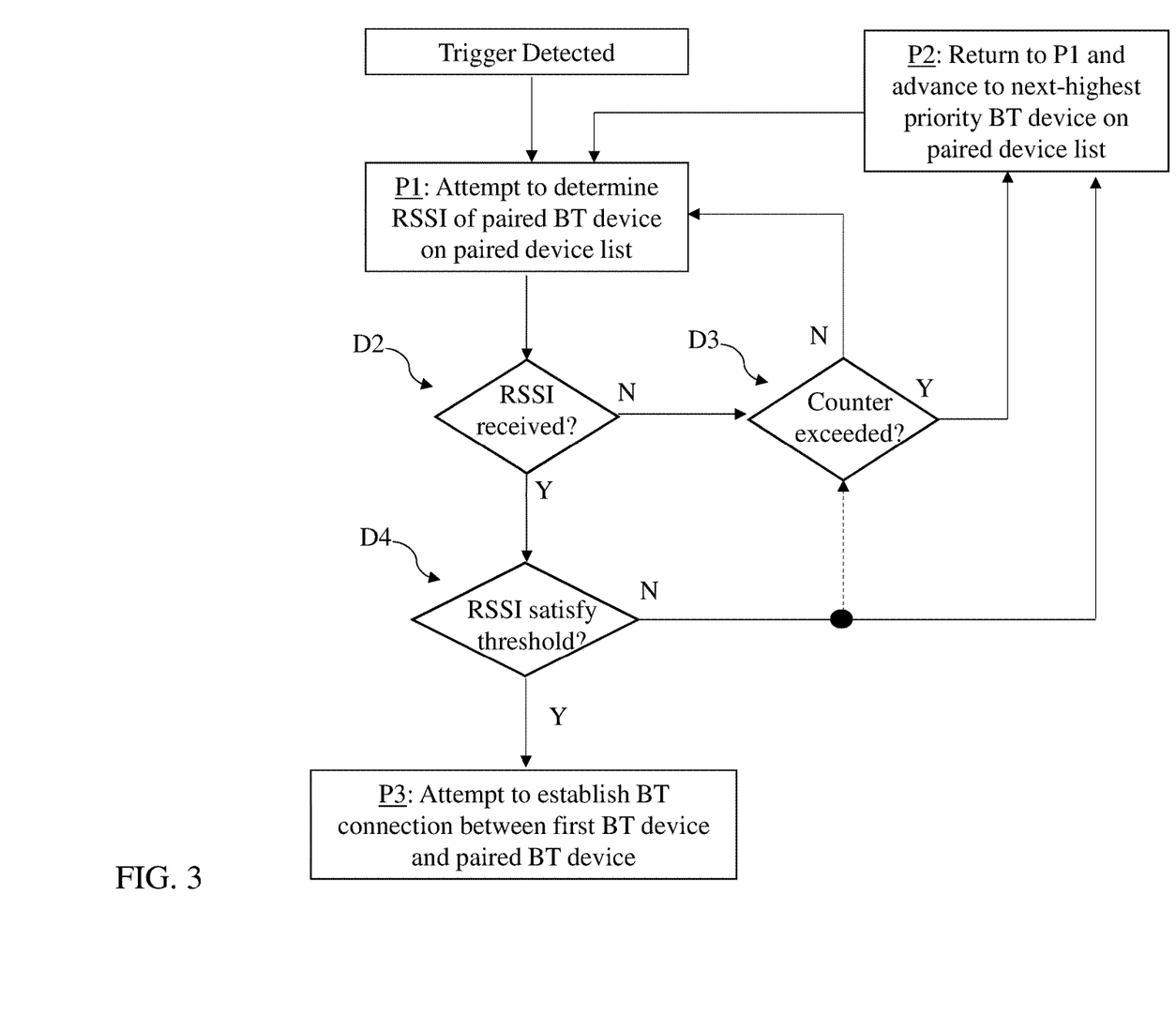
FIG. 3 is a flow diagram illustrating processes in a method according to various implementations.

With reference to FIGS. 1 and 2, according to various implementations, the controller 50 in BT device 20 is configured to enable proximity-based connection with BT devices on the paired device list 110, e.g., BT device 30, BT device 40, BT device X, etc. FIG. 3 is a flow diagram illustrating processes in controlling the proximity-based connection between BT device 20 and devices on paired device list 110. It is understood that the flow diagram in FIG. 3 illustrates an example configuration in which a first BT device 20 attempts to connect to up to two distinct BT devices, e.g., an additional BT device 30 and a further additional BT device 40. It is understood that the method illustrated can be repeated progressively through the paired device list 110 as described herein. Turning to FIG. 3, processes can include:

Process P1: in response to detecting a trigger at a first BT device (e.g., device 20) attempting to determine a received signal strength indicator (RSSI) of an additional BT device paired to the first BT device 20. In some cases, the trigger includes at least one of: detecting BT range between the first BT device 20 and the additional BT device (e.g., BT device 30), providing an input at the first BT device 20, initiating charging of another device (e.g., additional BT device(s) 30, 40, etc.), mechanically actuating the first BT device 20, receiving an input from the additional BT device (e.g., BT device 30), a change in BT state of the first BT device 20 (e.g., BT enabled/disabled) or a change in power state of the first BT device 20 (e.g., power on, power off, standby).

In certain examples, the BT radio at BT device 20 detects the presence of the additional BT device within BT range, which acts as a trigger at the first BT device 20. In additional examples, the input at first BT device 20 includes: a button press (e.g., actuation of power button, BT connection button, or other volume adjustment button, or similar interface command at the first BT device 20); a command from a connected application (App), such as a power command, connection command, playback adjustment command; and/or a power on command at first BT device 20 or additional BT device(s) 30, 40, etc. In particular examples, mechanically actuating the first BT device 20 can include: opening a case housing the first BT device 20 (e.g., a headphone case, earbud case, audio eyeglasses case, etc.); and/or unpacking, opening or otherwise mechanically manipulating the first BT device 20 (e.g., opening a set of headphones or audio eyeglasses so as to prepare to don the device, moving an arm or mounting structure on a wearable audio device, positioning a speaker for resting on a surface, stepping onto or otherwise mounting a piece of exercise equipment, opening the door of a vehicle, triggering startup in a vehicle, etc.). In certain cases, receiving an input from the additional BT device (e.g., BT device 30) includes receiving BLE data indicating that the additional BT device (e.g., BT device 30) has moved into range of first BT device 20, or that BT was recently turned on at the additional BT device (e.g., BT device 30, or that the additional BT device (e.g., BT device 30) entered pairing mode, etc. Sensors in the additional electronics 100 (FIG. 1) can be configured to detect mechanical actuation, e.g., motion sensors, optical sensors, proximity sensors, etc. In certain cases, the form factor of the first BT device 20 will dictate available inputs and/or mechanical actuation mechanisms.

In various implementations, the additional BT device is on the paired device list 110, i.e., the additional BT device(s) has an established pairing with the first BT device 20, and has previously connected with the first BT device 20. In the example illustrated in FIGS. 1 and 2, the controller 50 attempts to determine the RSSI of BT device 30 due to its highest priority on the paired device list 110. In various implementations, the controller 50 at BT device 20 initiates a signal via the BT module 70 to send data packets to the BT module 70a at BT device 30, and receives a return signal indicating a power at which those data packets are received (e.g., as a percentage of the power of the transmitted data packets). The transmitted and returned signals are both sent over channels designated as data channels in the Bluetooth specification, or "classic" Bluetooth (as opposed to BLE specification). In some cases, the controller 50 is configured to attempt to determine a plurality of RSSI from the BT device 30, e.g., in succession, in order to determine a mean RSSI, median RSSI or other mathematically-significant indicator of RSSI over a period. In certain cases, the mean RSSI over a period or a number of RSSI attempts is used for the purposes of connection approaches according to implementations. As noted herein, transmit power, environmental factors and other parameters can impact the measured RSSI value. While RSSI may be insufficient to calculate a position of an additional BT device (e.g., BT device 30) relative to the first BT device 20, RSSI can be used to calculate the relative proximity of multiple additional BT devices (e.g., BT device 30, BT device 40, etc.) to the first BT device 20. That is, RSSI values can be used to determine whether BT device 30 is nearer to or farther from the first BT device 20 compared with BT device 40 and/or further additional BT devices (e.g., on list 110)

With continuing reference to Process P1, in certain implementations, the controller 50 is configured to attempt to determine the RSSI of a paired BT device on the paired device list 110 that is not currently connected with the first BT device 20. In these configurations, prior to attempting to determine the RSSI of the highest-priority paired BT device (e.g., BT device 30, BT device 40, etc.) on the paired device list 110, the controller 50 is configured to check that the first BT device 20 is not currently connected to that highest-priority paired BT device. In the case that the current highest-priority BT device (e.g., BT device 30) is connected with the first BT device 20, the controller 50 is configured to re-prioritize the list 110 such that BT device 30 is deprioritized (e.g., moving below BT device 40, BT device X, etc. in the list 110). In these cases, the controller 50 infers that the trigger is not an attempt to connect already connected, powered-on devices.

Returning to FIG. 3, after attempting to determine the RSSI of the BT device 30, in Decision D2, the controller 50 determines: whether an RSSI was received from the BT device 30. If No, then the controller checks a counter in Decision D3 to determine whether a predefined number of RSSI attempts has been met or exceeded for the attempted connection with BT device 30. If the counter has not been exceeded (No to D3), the process reverts to P1 in another attempt to determine the RSSI of BT device 30. If the counter is exceeded (Yes to D3), in process P2, the controller 50 returns to process P1 and advances to the next-highest priority BT device on the paired device list 110 (e.g., BT device 40). When the above-noted conditions are satisfied, moving to the next-highest priority BT device can be performed progressively on a device-by-device basis, e.g., until a timeout, exceeded number of attempts, and/or checking all of the devices on the paired device list 110.

In some cases, the next-highest priority BT device on the list 110 is selected from a remainder of the list 110 based on a determined RSSI of the additional BT devices and/or a known RSSI characteristic of the BT devices on the list 110. For example, a known RSSI characteristic of the BT device can include, e.g., whether the BT device has a chipset that provides greater RSSI, or whether device is currently outputting audio, and/or whether device was recently powered on. Additional factors impacting RSSI can include environmental factors such as temperature and/or humidity, as well as the presence of other active BT radios within the vicinity. In some cases, the list 110 can be filtered, periodically or in response to a trigger (e.g., selecting a next-highest priority BT device on the list such as in Process P2, or adding or subtracting a BT device from the list 110). In certain examples, the filtering includes removing or reprioritizing a duplicate BT device, a BT device incapable of outputting audio, a device currently connected to the first BT device 20, a device most recently connected to the first BT device 20, a device that is unresponsive to connection attempts, or secondary devices in a paired or grouped device system. For example, filtering can include removing a second earbud in a wireless pair (e.g., where both are discoverable by BT), or a second or additional speaker in a stereo pair or stereo group (e.g., where the separate speakers are discoverable by BT). In certain of these cases, only a single, representative BT device is considered for priority in the list 110. Additionally, the duplicate BT device can be removed from the list 110 or placed in a low priority slot on the list 110. In still further implementations, a BT device that is incapable of outputting audio can be removed from the list 110 or otherwise deprioritized. In some instances, the list 110 is filtered periodically, e.g., to remove unresponsive devices, duplicate devices such as two instances of the same device as in the example of earbuds, or secondary devices in a paired or grouped device system such as worker speaker(s) in a master-worker group. In various implementations, periodically filtering the list 110 increases the speed of future connection attempts by reducing the chances of attempting to connect with a device that is unlikely to be the desired device connection.

In certain cases, the counter can be generic to each BT device (or priority slot) in the paired device list 110 (e.g., X number of attempts are permitted for RSSI determination from each paired BT device 30). In other cases, the counter is regressive, in that a greater number of attempts are permitted for higher-priority BT devices on the paired device list 110 as compared with lower-priority BT devices. In still further implementations, the counter varies based on a known connection characteristic of the BT device(s), e.g., whether a BT radio has a stronger v. weaker signal in a particular BT device. In some cases, the controller 50 makes at least one attempt to determine the RSSI of BT device 30 before moving to the next-highest priority BT device on the list 110. In particular cases, repeating the attempt to determine an RSSI of the additional BT device (e.g., BT device 30) is performed approximately 1-10 times prior to attempting to determine an RSSI of the further additional BT device. In more particular cases, repeating the attempt to determine an RSSI of the additional BT device (e.g., BT device 30) is performed approximately 1-3 times prior to attempting to determine an RSSI of the further additional BT device. In some aspects, repeating the attempt approximately 1-3 times reduces time taken to achieve a successful connection for the end user, thereby balancing connectivity robustness with the user experience. In certain implementations, the number of repeated attempts to determine RSSI vary based on the type of device(s) being connected, the previous RSSI behavior of the additional BT device (e.g., previously detected RSSI relative to threshold), the priority of the additional BT device on the list 110 (e.g., fewer repeats for lower-priority devices on the list 110), etc.

As described herein, even with repeated attempts to connect BT device 20 with BT devices (e.g., BT device 30, BT device 40, etc.), the various implementations relying on RSSI-based approaches will save several seconds or more per attempt to connect when compared with conventional approaches. That is, the approaches according to various implementations can save upwards of 30 seconds or more in connection in a list of several or more devices when compared with conventional BT connection approaches (also referred to as conventional BT cycling approaches).

Returning to FIG. 3, with reference to Decision D2, if the controller 50 receives an RSSI from BT device 30 (Yes to D2), the controller 50 compares that RSSI with a threshold in Decision D4. As noted herein, the controller 50 can use an average, median or some other mathematically significant determination of the RSSI to assess the proximity of BT device 20 and the additional BT device 40. In certain implementations, the threshold is indicative of an approximate proximity between devices, e.g., based on known minimum RSSI from certain types of devices. In some examples, the threshold is indicative of a proximity between devices, and can be particularly indicative of relative proximity between BT device 20 and two or more additional devices (e.g., BT device 30, BT device 40, etc.). In some cases, known minimum RSSI can vary based on the BT module 70*a*, 70*b*, etc. in a given device, the device type (e.g., smart phone v. speaker), device usages (e.g., higher power usage v. lower power usage), environmental factors such as obstacles, antenna types, orientation, environmental reflection and absorption of the signal, product exterior material(s), etc. In certain cases, the threshold can be set to be indicative of an approximate proximity between BT devices, e.g., of an approximate distance such as several feet or more, with consideration for the above-noted factors impacting RSSI. In any case, the threshold can be set at a percentage or range of percentages (of the transmitted signal strength), a fixed value or range of values (e.g., in arbitrary units, or power level (dBm)), or a variable value or range of values (e.g., differing based on known signal strength conditions of the additional BT devices 30, 40, and/or known conditions about the environment).

In various implementations, whether an RSSI value satisfies a given threshold is used as an indicator of confidence that the first (e.g., sink) BT device 20 is in close enough proximity to the additional (e.g., source) BT device 30, 40, etc., to infer a desire to connect to that first BT device 20. The RSSI value can be used as a threshold in order to infer the desire to connect, and/or as a mechanism to choose between multiple BT devices that could be the desired connection device. That is, in still further implementations described with reference to FIG. 4, RSSI can be used to choose between connection with additional BT devices 30, 40, etc., as an indicator of likely relative proximity to BT device 20.

Further, the RSSI threshold can be user-customized to control the desired sensitivity for a given user or group of users. For example, if a user only wants a first (e.g., sink) BT device 20 to connect if that device is in very close proximity (e.g., several feet or less) to an additional (e.g., source) BT device 30, 40, etc., the RSSI threshold value (or percentage) can be increased. These approaches can allow the user to refine the functions of the controller 50 (FIG. 1), with changes made via any interface or interface command described herein.

Further, it is understood that while multiple BT devices (e.g., BT device 30, BT device 40, BT device X, etc., FIG. 2) may be within BT range to connect to BT device 20, not all such devices will necessarily satisfy the RSSI threshold. That is, use of the RSSI threshold can narrow the list of previously connected BT devices currently within BT range to those with a greater likelihood of being the desired device for connection. As such, the RSSI-based approaches described according to various implementations can introduce proximity into the BT connection determination, enhancing the user experience. These approaches can be particularly useful in enhancing the user experience where multiple different previously-paired BT devices are within range of one another (e.g., multiple different sink devices within BT range of a source device).

In response to determining that the detected RSSI for the additional BT device (e.g., BT device 30) does not satisfy the threshold (No to D4), the process proceeds to P2 in order to select a next-highest priority device on the list 110 and attempt to determine the RSSI of that next-highest priority device in P1. In various implementations, this approach can enable moving through the list 110 of devices in an efficient manner to determine a likely desired connection. Additionally, various implementations assume that once an RSSI is detected, it is unlikely to significantly change (unless devices are dynamically changing position). These RSSI threshold-based approaches can enable expeditious processing of connection options for multiple devices, e.g., moving to the next-highest priority device on the list 110 (P2) after a No to D4.

In certain optional implementations (indicated in phantom), in response to a detected RSSI that fails to satisfy the threshold (No to D4) the process includes checking against the counter (D3), as described herein. It is understood that the counter can be distinct for instances where the RSSI is not received (No to D2) as compared with instances where the RSSI is received but does not satisfy the threshold (No to D4). In some examples, the counter, or number of permitted repeat attempts, is higher for scenarios where the RSSI is received but not satisfied (No to D4) than for scenarios where the RSSI is not received (No to D2). In any case, the counter(s) can be adjusted to account for the tradeoff between time taken to make a connection and the reliability of the connection between devices.

Returning to FIG. 3, in response to determining that the RSSI for the additional BT device (e.g., BT device 30) satisfies the threshold (Yes to D4), the approach proceeds to process P3: attempting to establish a BT connection between the first BT device 20 and the additional BT device (e.g., BT device 30). This process can include establishing a (classic) BT connection for required services (e.g., audio and others). Based on the current operating state (e.g., active call, music playback, etc.) of the additional BT device, the additional BT device can start transmitting data over this new BT connection.

Figure 4:
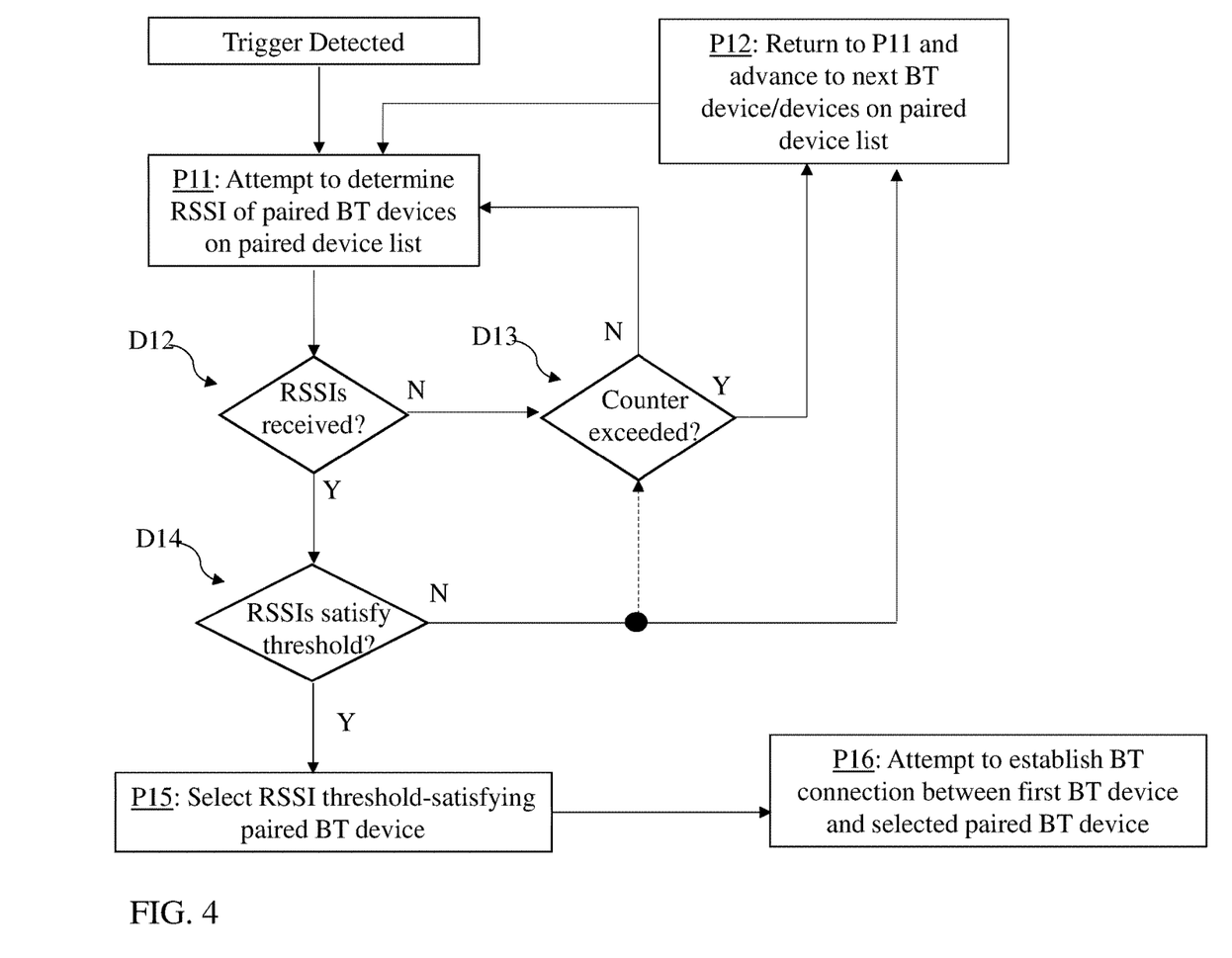
FIG. 4 is a flow diagram illustrating processes in a method according to various additional implementations.

FIG. 4 illustrates an additional implementation in which multiple additional BT devices (e.g., BT device 30 and BT device 40) are considered for connection with BT device 20 based on RSSI at a given time. Certain processes in these implementations can be performed using the priority of devices on list 110 (FIG. 2), but certain other processes can be used to supplement and/or replace the priority listing of devices on list 110. Several of the processes illustrated in FIG. 4 are similar to processes and decisions illustrated with reference to FIG. 3. As shown, in response to any trigger described herein, the controller 50 at BT device 20 is configured to attempt to determine an RSSI of multiple paired BT devices on the list 110 (FIG. 2). In these cases, the BT device 20 can contemporaneously, or sequentially, send signals to two or more BT devices on the list 110 in an attempt to determine the RSSI from those BT devices.

In decision D12, if no RSSI is received from any BT device on list 110 (No to D12), the controller 50 checks the counter in D13, and attempts to connect to the same BT devices again (No to D13, return to P11) if the counter is not exceeded. If the counter is exceeded (Yes to D13), the process proceeds to P12, and controller 50 advances to a next BT device or next group of BT devices on the list 110 and returns to process P11. In some cases, the next BT device/devices are selected based on a previously defined device priority (e.g., as described relative to list 110 in FIG. 2). However, the next BT device/devices can be selected according to any other scheme, e.g., randomly from the list 110. The processes can be repeated for one or more BT devices, e.g., in pairs or other groups to expedite selection of a likely preferred BT device for connection.

In decision D12, if an RSSI is received from any of the BT devices (Yes to D12), in decision D14, the controller 50 compares the received RSSI(s) with a threshold (as described herein). The RSSI threshold can be similar to the RSSI threshold described with reference to D4 and FIG. 3, herein. If none of the received RSSI(s) satisfy the threshold (No to D14), the process returns to P12 and then P11, with a next BT device or devices on the list. As noted with respect to decision D3 in FIG. 3, in an optional implementation (Decision D13) a same or different counter can be used to control whether to perform further RSSI investigation of the same or different BT devices.

Returning to decision D14, in response to at least one BT device having an RSSI satisfying the threshold (Yes to D14), the controller 50 is configured to select one of the additional BT devices that satisfy the threshold for a BT connection attempt (process P15). In some cases, the controller 50 selects a BT device (e.g., BT device 30) based on priority over one or more other BT devices that satisfy the RSSI threshold. In particular examples, priority is determined by the priority on list 110 (e.g., a predetermined and/or periodically updated priority), according to any priority approach described herein. In still further implementations, the controller 50 compares the RSSI received from each BT device that satisfies the threshold to determine a highest RSSI from the threshold-satisfying group. In these cases, the controller 50 is configured to select the BT device with the highest RSSI from among the threshold-satisfying group. In particular aspects, as noted herein, a higher RSSI can be indicative of closer relative proximity, and by selecting the BT device with the highest RSSI, the approach can infer that the user wishes to connect the BT device that is closest to the BT device 20. However, additional selection and/or prioritization approaches are possible, as described herein.

In any case, after selecting the additional BT device for connection from the threshold-satisfying group, the controller 50 is configured in process P16 to attempt to establish a BT connection between first BT device 20 and that selected additional BT device (similarly described with reference to P3 in FIG. 3). It is understood that one or more processes in the method illustrated in FIG. 4 could be applied to the processes in the method illustrated in FIG. 3, and vice versa.

While the controller 50 is configured to control connection between BT devices according to RSSI-based approaches, these features can be disabled or otherwise bypassed on the first BT device 20 and/or any additional BT devices capable of performing the herein-noted processes. For example, in some cases, the controller 50 is configured, in response to a user command, to attempt to establish a BT connection between the first BT device 20 and an additional BT device (e.g., highest-priority BT device 30) without determining an RSSI of that additional BT device. That is, in response to a user command, the controller 50 can be configured to apply a conventional approach to connecting the BT device 20 with the highest-priority BT device on list 110, which in various cases is the most recently connected additional BT device or the most frequency connected additional BT device. User commands can take any form described herein, e.g., a voice command, tactile interface command such as a button press, gesture-based command such as a head nod or head shake, an interface command made via a connected application (App), either at the BT device 20 or on another connected device such as a smart phone or tablet, etc.

In any case, the approaches described according to various implementations have the technical effect of enhancing Bluetooth based connection between already paired devices. For example, approaches disclosed according to various implementations can improve the accuracy of intended device connections, as well as reduce latency in connections when compared with conventional approaches. Because conventional Bluetooth-based connection approaches rely on the unreliable and/or inconsistent signals received over Bluetooth, those approaches often involve repeated attempts to connect devices, each of which has its own associated latency. Further, the Bluetooth signal range is greater than the RSSI range, so a larger number of BT devices, at a greater separation distance, are considered in the conventional connection approach. In contrast, the disclosed RSSI-based approach can narrow the group of potential paired BT devices for connection based on the received RSSI, which is necessarily indicative of proximity. These approaches can avoid the false positive connections, and delays that frustrate users.

Take an example scenario where a user wishes to connect a smart phone (as a source device) with a speaker or wearable audio device (as a sink device) in her living room. The user's home also has a tablet computer upstairs in a bedroom and a laptop in an office that is separate from the living room. The tablet was most recently connected with the speaker (or wearable audio device). In a conventional approach, the user can initiate a trigger, such as powering on the speaker or wearable audio device while the smart phone is powered on. In some cases, the user may trigger a Bluetooth connection button or other interface command, while in other cases, the devices are configured to automatically attempt a connection. In any case, in response to the trigger, the conventional approach will attempt to connect the speaker with the most recently connected device in Bluetooth range, which in this case, is the tablet in the bedroom upstairs. In certain instances, the conventional approach will attempt to connect the speaker with the tablet multiple times until detecting a stable connection, which can take up to several seconds per connection attempt. Even if successful in connecting the speaker with the tablet, the user attempting to connect the smart phone in the same room as the speaker is frustrated because her intended device connection has been bypassed based on Bluetooth range and recency of connection. The user may have to enter or otherwise engage a menu (e.g., a visual menu, or an audio interface) for one or more of the BT devices to select the intended connection between the speaker and the smart phone.

In contrast, the approaches according to various implementations attempt to determine an RSSI of a highest-priority paired BT device prior to attempting to make the BT connection. Because the RSSI is a strong indicator of device proximity, not all devices that are within Bluetooth range will qualify for connection using the disclosed approaches. In the above-noted example, the RSSI-based threshold can be set such that the tablet computer in the upstairs bedroom and the laptop in the office will not provide an RSSI that satisfies the threshold (e.g., an RSSI associated with approximately 1-3 meters of physical proximity). As such, even though the tablet computer is higher on the priority list than the smart phone that the user wishes to connect, the approaches described herein will move down the priority list after failing to detect an RSSI from the tablet computer that satisfies the threshold. These approaches can efficiently and automatically arrive at the intended connection between the smart phone and the speaker that are in the same room as one another, providing a more intuitive approach than conventional recency-based (or priority-based) rules. This is one of many example benefits of the disclosed approaches when considered in view of conventional systems and methods.

The above description provides an embodiment that is compatible with BLUETOOTH SPECIFICATION Version 5.2 [Vol 0], 31 Dec. 2019, as well as any previous version(s), e.g., version 4.x and 5.x devices. However, it should be understood that the approach is equally applicable to other wireless protocols (e.g., non-Bluetooth, future versions of Bluetooth, and so forth) in which communication channels are selectively established between pairs of stations. Further, although certain embodiments are described above as not requiring manual intervention to initiate pairing, in some embodiments manual intervention may be required to complete the pairing (e.g., "Are you sure?" presented to a user of the source/host device), for instance to provide further security aspects to the approach.

In some implementations, the host-based elements of the approach are implemented in a software module (e.g., an "App") that is downloaded and installed on the source/host (e.g., a "smartphone"), in order to provide the pairing capability according to the approaches described above.

While the above describes a particular order of operations performed by certain implementations of the invention, it should be understood that such order is illustrative, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, unless otherwise noted, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. A method comprising:
in response to a trigger at a first Bluetooth (BT) device, attempting to determine a received signal strength indicator (RSSI) from each of a set of additional Bluetooth (BT) devices paired to the first BT device,
in response to determining the RSSI for a first additional BT device and a second additional BT device in the set of additional BT devices, determining if the RSSI of each of the first additional BT device and the second additional BT device satisfies a threshold, and
in response to determining that the RSSI of both the first additional BT device and the second additional BT device satisfy the threshold, selecting either the first additional BT device or the second additional BT device for connection with the first BT device.

2. The method of claim 1, further comprising,
attempting to establish a BT connection between the selected one of the first additional BT device or the second additional BT device and the first BT device.

3. The method of claim 1, wherein the set of additional BT devices includes at least three BT devices.

4. The method of claim 1, wherein each of the set of additional BT devices is included in a list of BT devices paired to the first BT device, wherein the list of BT devices paired to the first BT device each have previously connected with the first BT device with a BT connection and are not currently connected with the first BT device.

5. The method of claim 4, wherein selecting the first additional BT device or the second additional BT device is based on a priority on the list of BT devices.

6. The method of claim 5, wherein selecting the first additional BT device or the second additional BT device is further based on comparing the determined RSSI of each of the first additional BT device and the second additional BT device with the threshold.

7. The method of claim 1, wherein selecting the first additional BT device or the second additional BT device is based on a highest determined RSSI.

8. The method of claim 1, further comprising,
in response to not receiving the RSSI from the first additional BT device and the RSSI from the second additional BT device, checking a first device connection counter.

9. The method of claim 8, further comprising,
in response to the first device connection counter being exceeded, attempting to determine an RSSI of a third additional BT device in the set of additional BT devices.

10. The method of claim 8, further comprising,
in response to the first device connection counter not being exceeded, again attempting to determine the RSSI of the first additional BT device and the second additional BT device.

11. The method of claim 1, further comprising,
in response to the received RSSI from the first additional BT device and the received RSSI from the second additional BT device each not satisfying a threshold, checking a second device connection counter.

12. The method of claim 11, further comprising,
in response to the second device connection counter being exceeded, attempting to determine an RSSI of a third additional BT device in the set of additional BT devices.

13. The method of claim 11, further comprising,
in response to the second device connection counter not being exceeded, again attempting to determine the RSSI of the first additional BT device and the RSSI of the second additional BT device.

14. A first Bluetooth (BT) device comprising:
a BT radio, and
a controller coupled with the BT radio and configured to control a BT connection by,
in response to a trigger at the first BT device, attempting to determine a received signal strength indicator (RSSI) from each of a set of additional Bluetooth (BT) devices paired to the first BT device,
in response to determining the RSSI for a first additional BT device and the RSSI for a second additional BT device in the set of additional BT devices, determining if the RSSI of each of the first additional BT device and the second additional BT device satisfies a threshold, and
in response to determining that the RSSI of both the first additional BT device and the second additional BT device satisfy the threshold, selecting either the first additional BT device or the second additional BT device for connection with the first BT device.

15. The BT device of claim 14, further comprising an electro-acoustic transducer coupled with the controller for providing an audio output, wherein each of the set of additional BT devices is included in a list of BT devices paired to the first BT device.

16. The BT device of claim 15, wherein the additional BT devices included in the list of BT devices each have previously connected with the first BT device with a BT connection and are not currently connected with the first BT device.

17. The BT device of claim 16, wherein selecting the first additional BT device or the second additional BT device is based on: (i) a priority on the list of BT devices, and (ii) a comparison of the determined RSSI of each of the first additional BT device and the RSSI of the second additional BT device with the threshold.

18. The BT device of claim 14, wherein the controller is further configured to establish a BT connection between the selected one of the first additional BT device or the second additional BT device and the first BT device.

19. The BT device of claim 15, wherein the set of additional BT devices includes at least three BT devices.

20. The BT device of claim 15, wherein the controller is configured to,
in response to the received RSSI from the first additional BT device and the received RSSI from the second additional BT device each not satisfying a threshold, checking a second device connection counter.

* * * * *